Figure 1:
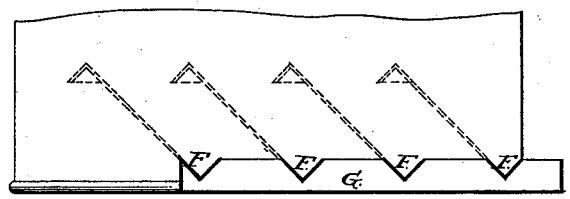
Figure 2:
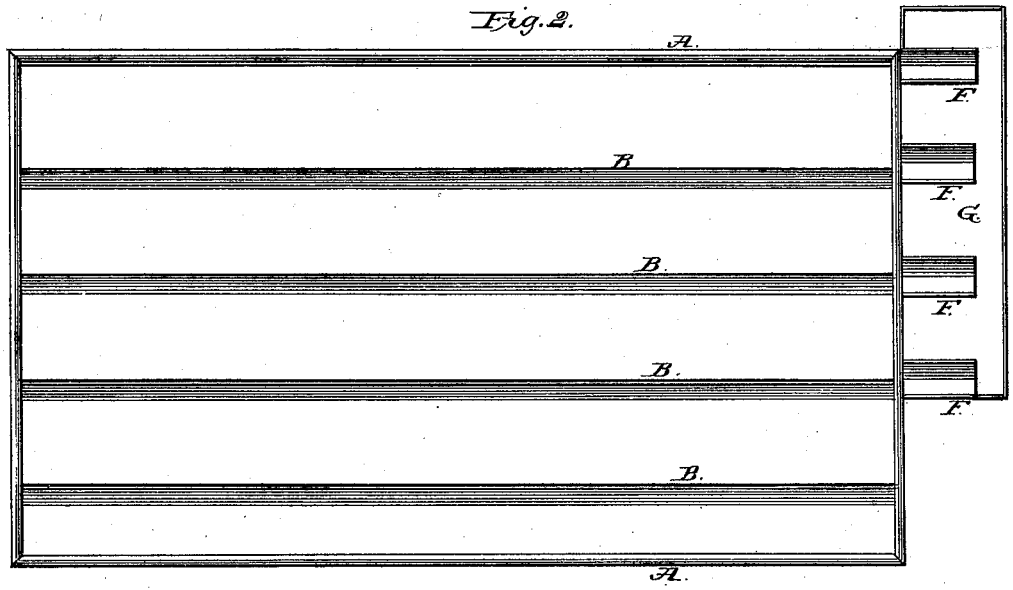
Figure 3:
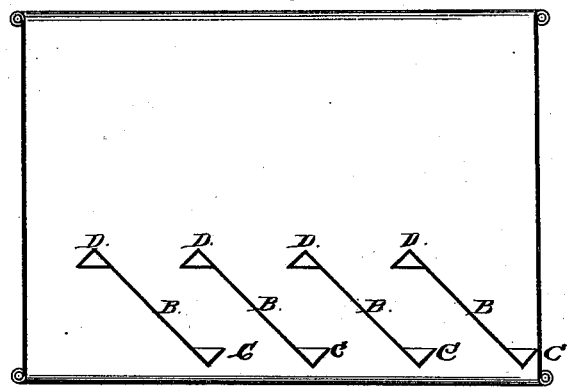

E. O. THOMAS, Sr.
BROILER.

No. 176,819. Patented May 2, 1876.

Witnesses:
John McCutcheon
Frank Fuchs

Inventor:
Evan O. Thomas Sr.

UNITED STATES PATENT OFFICE

EVAN O. THOMAS, SR., OF DAYTON, OHIO.

IMPROVEMENT IN BROILERS.

Specification forming part of Letters Patent No. 176,819, dated May 2, 1876; application filed November 1, 1875.

*To all whom it may concern:*

Be it known that I, EVAN O. THOMAS, Sr., of Dayton, in the county of Montgomery, State of Ohio, have originated an invention for Broiling and Roasting any Kind of Meat and saving all the fat, of which the following is a specification:

The frame $a$ I make of sheet-iron, or its equivalent, in form square, or nearly so. The bars B B I make of tin, or its equivalent, of sufficient width to conduct the fat into the gutter on the lower part of the bar. The bars are fixed in a slanting position; the top of each bar will be even by a vertical line with the bottom of each former one. The gutters C C are formed by bending up the lower part of the bar. The tops of the bars D D are bent back to prevent the fat from following the under side of the bar. The discharging ends of the gutters F F will reach through the frame in front, connecting with the receiver G G.

I claim as my invention—

The bars B, provided with gutters C and flanges D, in combination with gutters F and receiver G, substantially as set forth.

EVAN O. THOMAS, SR.

Witnesses:
JOHN MCCUTCHEON,
FRANK FINK.